April 22, 1947. R. J. HEITZMAN 2,419,352
TOOL FOR FORCING THE BEAD OF A PARTIALLY MOUNTED TIRE INTO THE RIM
Filed Sept. 29, 1944
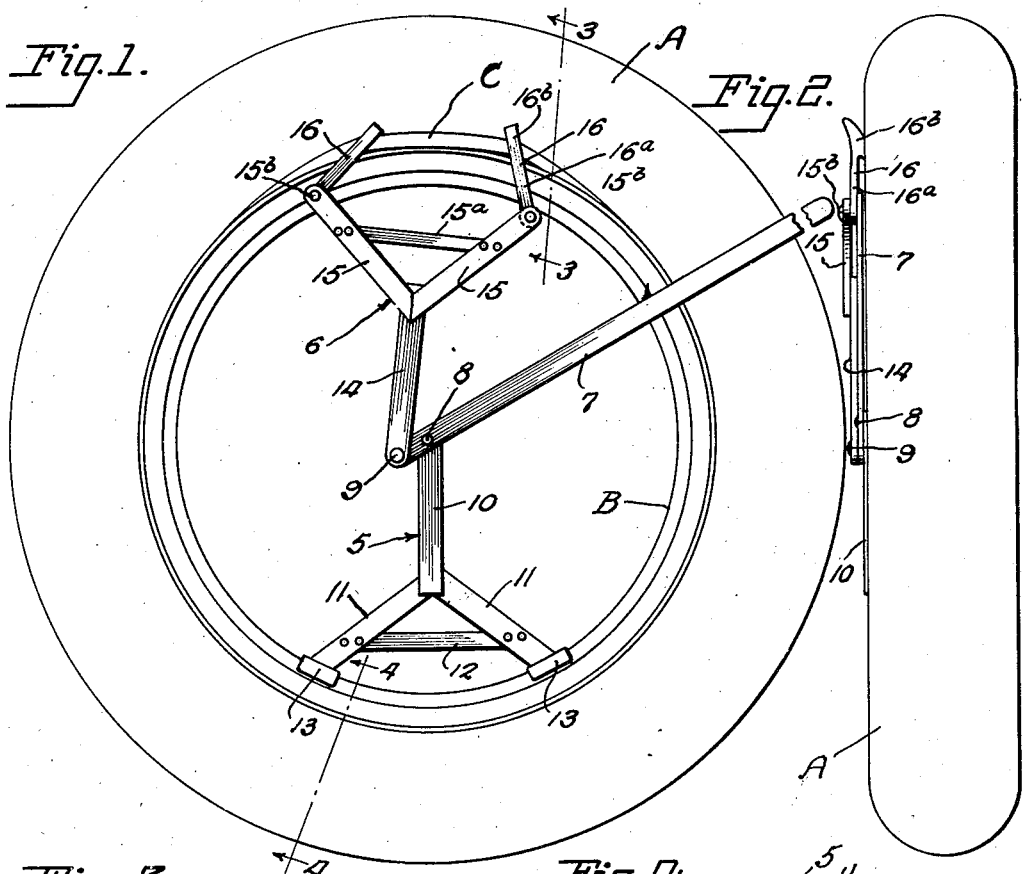
Inventor
R. J. Heitzman
By Mason Fenwick & Lawrence
Attorneys Patented Apr. 22, 1947

2,419,352

UNITED STATES PATENT OFFICE 2,419,352

TOOL FOR FORCING THE BEAD OF A PARTIALLY MOUNTED TIRE INTO THE RIM

Richard J. Heitzman, Shamokin, Pa., assignor of one-half to William H. Ressler, Shamokin, Pa.

Application September 29, 1944, Serial No. 556,395

1 Claim. (Cl. 157—6)

This invention relates to a tire applying tool for forcing the bead of a partially mounted tire into the rim and is especially designed for heavy duty use, such as in applying heavy tires to truck and bus wheels.

Although drop-center type tire rims have, to a considerable extent, lessened the burden of applying tires, it is still necessary to exert considerable effort in order to overcome and properly seat the final or chordal portion left after the major portion of the tire has been properly seated. The manual exertion increases usually in proportion to the size of the tire, so that for a large truck or bus tire several men are called upon to accomplish the strenuous task.

The principal object of the invention is to provide a tire tool whereby the final or chordal portion of a partially applied tire may be quickly and conveniently forced into rim seated position.

Another object is to provide a tool of this character which is made up of a minimum number of operating parts, to the end that positive action, stability and durability shall be enhanced.

Still another object of the invention is to provide a tire applying tool which, after the tire and rim engaging parts thereof have been properly set, requires only a single stroke hand lever action to accomplish the intended result.

A further object of the invention is to provide an extensible tire applying tool which utilizes a portion of the complemental rim as an abutment for one end thereof in the operation of applying a tire.

Other objects and advantages of the invention shall become apparent to the reader of the following description.

In the drawings:

Figure 1 is a side elevation showing the tool engaged with a tire and complemental rim;

Figure 2 is a front elevation showing the tool applied;

Figure 3 is an enlarged cross section taken on line 3—3 of Figure 1, showing the unseated chordal portion of the tire engaged by the tool; and Figure 4 is an enlarged section taken on line 4—4 of Figure 1, showing that portion of the rim used as an abutment for the tool.

Referring to the drawings wherein like numerals designate like parts, it can be seen that reference character A denotes a tire, while reference character B represents a complemental rim of the drop-center type.

In applying tires, and especially heavy tires, to rims of this type, the tire is usually applied quickly and conveniently excepting for a small final or chordal portion C which ordinarily requires the use of pry tools and the expenditure of considerable human energy to seat.

The present invention is composed of two major parts, namely, a fulcrum section 5 and a force applying section 6, each of substantially Y-shape. A hand lever 7 fulcrumed on the section 5, as at 8, has the drive end thereof pivoted to the inner end of the section 6, as at 9.

More specifically, the fulcrum section 5 included a bar 10 and diverged legs 11—11 of equal length projecting from its end opposite from the fulcrum 8. A brace member 12 between the legs 11—11 prevents spreading of the legs, the latter being provided with angular feet 13—13 to engage the rim, as shown in Figure 4.

As is apparent (see Figure 1), the legs 11—11 are of equal length and project on the same angular divergence from the bar 10, so that when the feet 13—13 are engaged with the rim B, the bar 10 will assume a position diametrical of the rim. It is preferable that the fulcrum point 8 be substantially at the center of the rim when the parts of the tool are properly positioned for use. The tool is universal as to its disposition on the circumference of the rim, due to this diametrical positioning.

The force applying section 6 is also substantially Y-shaped and is composed of a bar 14 having equal length and diverged legs 15—15 braced by a bar 15a which prevent the legs from spreading.

Pivotal cam-hook members 16 are provided on the outer ends of the legs 15—15, the same being pivoted as at 15b. Each of these cam-hook members 16 consist of an arm 16a which is enlarged at its tire engaging side, as at 16b. The tire side of this enlargement or head 16b is beveled outwardly and slightly concave, as shown in Figure 3, as denoted by reference character 16c, thus forming a cam surface.

Curving toward the tire and then backwardly from the lateral most portion of the head 16b is a hook 16d which is intended to ride between the lip of the rim B and the chordal portion of the tire, as shown in Figure 3.

In the operation of the tool, the hooks 16d may best be engaged by first fully contracting the tool and seating the feet 13 upon the rim. The hooks 16d are then slipped over the lip of the rim beyond the ends of the chordal portion of the bead where the tire is loose in the depressed center of the rim. The cam hook members are then manually tilted toward the chordal portion of the bead and forced against said chordal portion as far as possible until they assume the toed-in position shown in Figure 1.

Assuming the parts have been first positioned as shown in Figure 1, by pressing downwardly on the hand lever 7, the section 5 serving as a fulcrum at 8, the force applying section 6 will be lifted. The action of the lever 7 transmits force substantially diametrically across the rim in a direction parallel to the bar 10, and this force is translated to parallel lines passing through the pivots 15b with the result that the toed-in cam-hook members 16 are caused to rotate inwardly as they move along their parallel force lines in opposition to the resistance offered by the friction of the heads 16b of the members 16, against the rim B and chordal portion C of the tire. This movement effects a wedging action of the heads 16b between the rim and the chordal portion of the tire, with the result that as the members 16 rotate and are caused to slide along the lip of the rim, the chordal portion of the tire is lifted upon the inner cam faces 16c of the heads 16b above the lip of the bead, and simultaneously moved inward with respect to the lip of the rim so that as the heads 16b slip free from the rim, the disengaged portion of the bead drops within the rim.

While the foregoing description sets forth the invention in specific terms, it is to be understood that numerous changes in the shape, size and materials may be resorted to without departing from the spirit and scope of the invention as claimed hereinafter.

Having thus described my invention, I claim:

Tire mounting tool comprising a hand lever, a fulcrum support pivotally mounted on said hand lever near one end having spaced feet in the plane of swing of said lever for engaging a wheel rim substantially opposite the chordally stretched final portion of the tire bead to be seated within said rim, a cam hook support pivotally mounted at the end of said lever to extend parallel and in opposite direction to said fulcrum support, cam hooks having arms pivoted at one end at laterally spaced points on said cam hook support to swing in a plane parallel to the plane of swing of said lever, said arms having lateral extensions adjacent their free ends in a direction normal to the plane of swing of said lever, said extensions being undercut to form rim engaging hooks and convergent on the upper sides toward the free ends of said arms, said cam hooks adapted to be inserted between the rim and tire bead adjacent the ends of said chordally stretched portion, in mutually convergent position, whereby lifting force imparted by said lever is resolved into components acting upon said cam hooks to tilt them towards one another in sliding engagement with the bead.

RICHARD J. HEITZMAN.

REFERENCES CITED

The following references are of record in the file of this patent:

UNITED STATES PATENTS

| Number | Name | Date |
|---|---|---|
| 1,394,400 | Berg | Oct. 18, 1921 |
| 819,156 | Morrill | May 1, 1906 |
| 1,448,211 | Grassfield | Mar. 13, 1923 |
| 1,098,488 | Dyar | June 2, 1914 |
| 1,219,948 | Kaehler | Mar. 20, 1917 |
| 1,349,541 | Willis et al. | Aug. 10, 1920 |
| 1,829,433 | Armstrong | Oct. 27, 1931 |
| 1,323,927 | Taylor | Dec. 2, 1919 |